United States Patent [19]

Schoenberger et al.

[11] Patent Number: 5,226,204
[45] Date of Patent: Jul. 13, 1993

[54] TELE-ROBOTIC PASSENGER LOADING BRIDGE CONTROL SYSTEM

[75] Inventors: Robert B. Schoenberger; William E. Mounts, both of Alexandria, Va.; Edward A. Jerrard, Sewickley, Pa.

[73] Assignee: Subtechnique, Inc., Alexandria, Va.

[21] Appl. No.: 654,047

[22] Filed: Feb. 12, 1991

[51] Int. Cl.⁵ .............................................. E01D 1/00
[52] U.S. Cl. .................................................. 14/71.5
[58] Field of Search ........................ 14/69.5, 71.5, 71

[56] References Cited

U.S. PATENT DOCUMENTS

| | | | |
|---|---|---|---|
| 3,606,626 | 8/1971 | Eggert, Jr. | 14/71.5 |
| 3,683,440 | 8/1972 | Xenakis | 14/71.5 |
| 3,913,757 | 10/1975 | Lovey | 14/71.5 |
| 4,161,049 | 7/1979 | Saunders et al. | 14/71.5 |
| 4,333,194 | 6/1982 | Drozd | 14/71.5 |
| 4,333,195 | 6/1982 | Lichti | 14/71.5 |
| 4,559,660 | 12/1985 | Lichti | 14/71.5 |
| 4,572,550 | 2/1986 | Harder | 14/71.5 |
| 4,817,223 | 4/1989 | Koch | 14/71.5 |
| 5,105,495 | 4/1992 | Larson et al. | 14/71.5 |

Primary Examiner—Terry Lee Melius
Assistant Examiner—Nancy P. Connolly

[57] ABSTRACT

Telerobotic control apparatus for aligning the movable end of a motorized passenger loading bridge to the door in a vehicle enabling the loading and unloading of passengers and freight. The apparatus includes an improvement display and control system. The apparatus includes: sensors, a display, a set of operator command input devices, and a computer to implement the whole system. The display includes video from a camera, a graphic representation of the relative position of the passenger loading bridge, and text and graphic information on the system status. The control system accepts commands from the operator in the operators frame of reference and converts them to the passenger loading bridge's frame of reference for moving the passenger loading bridge.

1 Claim, 6 Drawing Sheets

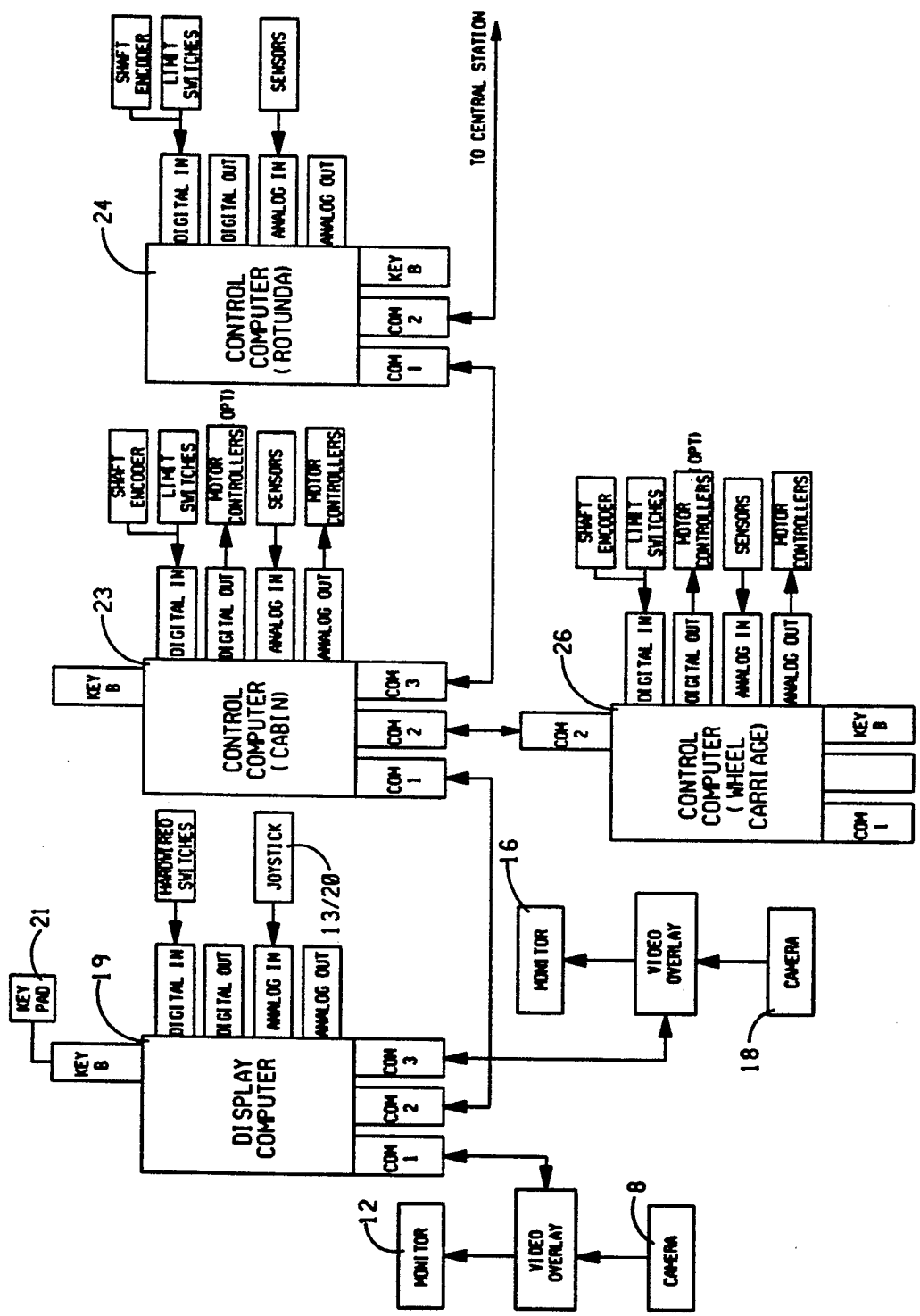

TELE-ROBOTIC PASSENGER LOADING BRIDGE CONTROL SYSTEM

CROSS REFERENCES TO RELATED APPLICATIONS

| UNITED STATES PATENTS | | | |
|---|---|---|---|
| 2,688,761 | 9/1954 | Good | 14/71 |
| 2,700,164 | 1/1955 | Henion | 14/71 |
| 2,875,457 | 3/1959 | Read | 14/71 |
| 3,038,185 | 6/1962 | Moore | 14/71 |
| 3,046,908 | 7/1962 | Yuen | 14/71 |
| 3,060,471 | 10/1962 | Yuen | 14/71 |
| 3,310,823 | 3/1967 | Preiss | 14/71 |
| 3,315,291 | 4/1967 | Wollard | 14/71 |
| 3,317,942 | 5/1967 | Wollard | 14/71 |
| 3,369,264 | 2/1968 | Kurka | 14/71 |
| 3,404,417 | 10/1968 | Wollard | 14/71 |
| 3,538,528 | 11/1970 | Porter | 14/71 |
| 3,543,318 | 12/1970 | Tushim | 14/71 |
| 3,561,030 | 2/1971 | Seipos | 14/71 |
| 3,599,262 | 8/1971 | Carder | 14/71 |
| 3,665,536 | 5/1972 | Jackson | 14/71 |
| 3,683,440 | 8/1972 | Xenakis | 14/71 |
| 3,808,626 | 5/1974 | Magill | 14/71.5 |
| 3,827,590 | 8/1974 | Lodjic | 14/71 |
| 3,909,691 | 9/1975 | Wilson | 318/490 |
| 3,913,757 | 10/1975 | Lovey | 214/38 BA |
| 4,318,197 | 3/1982 | Drozd | 14/71.5 |
| 4,318,198 | 3/1982 | Drozd | 14/71.5 |
| 4,333,194 | 6/1982 | Drozd | 14/71.5 |
| 4,344,200 | 8/1982 | Farr | 14/71.5 |
| 4,358,721 | 10/1982 | Farr | 318/604 |
| 4,852,197 | 8/1989 | Thomas | 14/71.5 |
| 4,860,975 | 8/1989 | Schliesing | 244/161 |
| 4,904,996 | 2/1990 | Fernandes | 340/870.07 |
| 4,942,538 | 7/1990 | Yuan | 364/513 |

STATEMENT AS TO RIGHTS TO INVENTIONS MADE UNDER FEDERALLY SPONSORED RESEARCH AND DEVELOPMENT

Not Applicable. No Federal monies involved.

BACKGROUND OF THE INVENTION

1. Field of the Invention

The disclosed apparatus pertains to the art of motorized passenger loading bridges and particularly to the apparatus used to control the alignment of these passenger loading bridges to the doors of the vehicle or vessel with which the passenger loading bridge is mating. The disclosed apparatus in particular refers to the control system for computer-aided/manual, tele-robotic, and automatic operations. Passenger loading bridges include, but are not limited to, airbridges and ship's covered gangplanks.

2. Description of the Prior Art

Passenger loading bridges are used to convey people between vehicles such as airplanes and ships and buildings such as airport or ship terminals. They are well described in U.S. Pat. Nos. such as Nos.: 2,700,164, 2,875,457, 3,038,185, 3,046,908, 3,060,471, 3,310,823, 3,315,291, 3,404,417, 3,683,440, 3,913,757, and 4,852,197 among others. Airbridges are used at most airports.

The operator consoles used on existing passenger loading bridges vary greatly from each other. Each manufacture has one or more console layouts for each airline and each model or variation of their passenger loading bridge. The actual operation of current passenger loading bridges has been inefficient resulting in costs to the airlines from docking delays and accidents. Also, training costs have been too high because of the variety and complexity in operator consoles and high staff turnover. Passenger loading bridges as typified by airbridges are currently operated by personnel of varying training and experience. This results in potential danger to both the airplane and airbridge. This is compounded by the situation wherein the sensors and displays currently used in airbridges are inherently unacceptably unreliable.

"Tele-robotics" refers to the engineering field of remote control with emphasis on the operator feeling as if they are in the location of the equipment being controlled via feedback such as video cameras and sensors, and being able to project their "presence" and control to that location. This has particular impact in that the operator can perform the same function whether using a control console actually located at the end of a passenger loading bridge or at any arbitrary distance away. Tele-robotics is actually a hybrid of "unadulterated" remote control and full automation. Specifically, the operator operates the system as if it were in manual, i.e. hardwired, but instead the computer interprets the commands and then modifies them greatly, slightly, or not at all based upon sensor data, the situation, and control algorithms.

Control systems for passenger loading bridges have been patented both by themselves, and more often, in the case of some of the simpler systems, within a general passenger loading bridge patent. These patents include U.S. Pat. Nos.: 2,688,761, 3,03,185, 3,046,908, 3,060,471, 3,310,823, 3,317,942, 3,369,264, 3,538,528, 3,543,318, 3,561,030, 3,599,262, 3,665,536, 3,683,440, 3,808,626, 3,827,590, 3,913,757, 4,333,194, 4,318,197, 4,318,198, 4,344,200, and 4,860,975. Most of these patents only cover simple wiring. The relevant patents are discussed in detail:

U.S. Pat. No. 4,318,197 "Conveyance Loader Drive and Steering System". From an engineering standpoint, this is a good mechanism with a poor user interface. It does not account for the fact that the user located in a rotatable vestibule, and as such, is orientated at a random position relative to the cabin and hence wheel carriage below the cabin. This is a situation which occurs most of the time with most of the passenger loading bridges. This patent mentions most practical variations except computer. It does not have sensors for measuring rotation of the wheel carriage.

U.S. Pat. No. 3,683,440, "Automatic Terminal Bridge Control System", mentions people and vehicles on the ground whose safety must be insured, however, it does nothing to facilitate this. To remedy this, the newly disclosed apparatus provides a camera and optional sensors to watch the area around the wheel carriage. Unlike the system shown in U.S. Pat. No. 3,683,440, which requires reflective tape, the newly disclosed apparatus shows in the fully automatic mode how the system can also automate the process but will not require any modification to the target vehicle. Airlines, for example, do not like to put on reflective tape, bar code, or other alignment/ranging markings on their airplanes. Prior art shows that inventors like to use such markings. This non-obvious approach satisfies the user's requirements without the shortfalls of previous inventions.

U.S. Pat. No. 3,913,757, "Control System for Load Carrier and Associated Transfer Apparatus", covers maintaining the axes of the freight (un)loading bridge relative to an airplane. It does not cover how the bridge was brought into position which is what the newly disclosed patent covers.

U.S. Pat. No. 4,860,975, "Smart Tunnel— Docking Mechanism", is overly smart. It uses a computer where a human operator would be more efficient. The result is a system which requires too much instrumentation, has too little flexibility, is very susceptible to failure, and undoubtedly will be very expensive to implement.

U.S. Pat. No. 4,318,198, "Conveyance Loader Wheel Position Indicator", appears to show wheel angle relative to tunnel rather than relative to the operator. Thus the joystick does not necessarily command the air bridge to move in the desired direction due to the frame of reference and the interaction between the wheel carriage motion and the length of the tunnel pinned at the terminal.

Most indicators in current use in airbridges are analog displays which are inherently unreliable due to voltage and calibration drift. Also an analog sensor is unsuitable for use with passenger loading bridges which have wheel carriages having a range of motion approaching or exceeding 360°. This is because, of the discontinuity between 360° and zero.

U.S. Pat. No. 4,942,538, "Telerobotic Tracker", is a classic telerobotic implementation. It differs from ours in the two critical areas that we are trying to patent: how our system displays, and how our system controls the passenger loading bridge. Yuan's system is concerned only with how to cancel out relative motion of a known target relative to the telerobot. Our system works for any target, and assumes a motionless target. Yuan's system requires a frame grabber while ours does not.

SUMMARY OF THE INVENTION

The disclosed apparatus is a control system which controls the motion of a passenger loading bridge. Passenger loading bridges are used to permit passengers to load and unload from a terminal building onto a airplane, boat, or other vehicle. The disclosed apparatus consists of one or two video cameras, video overlay unit(s), a user's console, a computer or computers to run the control algorithms, Input/Output boards to collect data and control the passenger loading bridge, wiring to connect the console to the rest of the passenger loading bridge and/or other computers distributed throughout the passenger loading bridge, and wiring to a central station. The disclosed apparatus is equally useful for retro-fitting on existing passenger loading bridges and on new builds. In the case of retro-fit, all or just part of the disclosed apparatus could be used as the apparatus was designed to interface to and permit as much use of components already in place on existing passenger loading bridges.

The operator sees the target vehicle either through the cameras or directly (i.e. out a window or door), and guides the passenger loading bridge to mate with the target vehicle through commands to the on-board computer via a combination of input/output devices such as joysticks, menus, and buttons. By using a tele-robotic approach, the system is designed such that the operator can control the passenger loading bridge either locally or at a remote site. The disclosed apparatus is also designed to permit an easy upgrade to a novel, unobvious, fully automated, robotic, docking and rendezvousing system which is also disclosed herein.

BRIEF DESCRIPTION OF THE DRAWINGS

FIG. 6 is a block diagram of the control system.

DETAILED DESCRIPTION OF THE INVENTION

Figure 1:
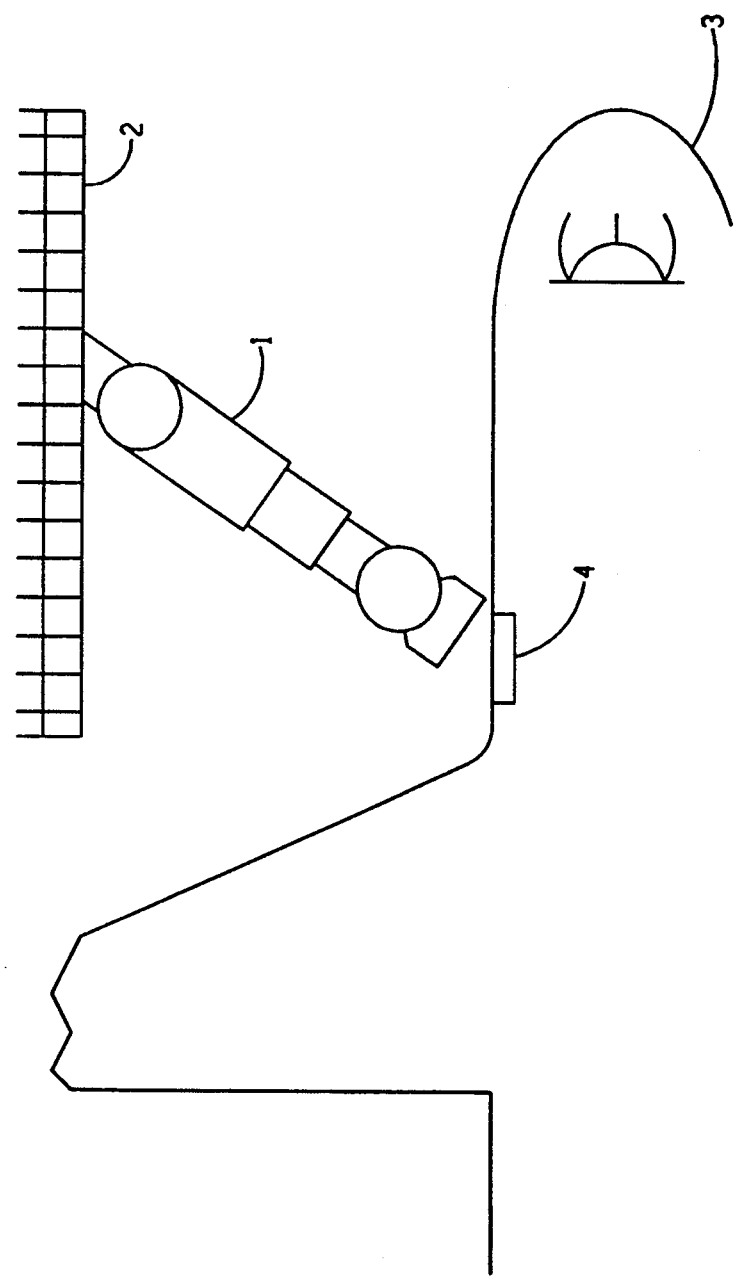
FIG. 1 is a top level drawing of a passenger loading bridge shown in conjunction with an aircraft and an airport terminal building.
Figure 2A:
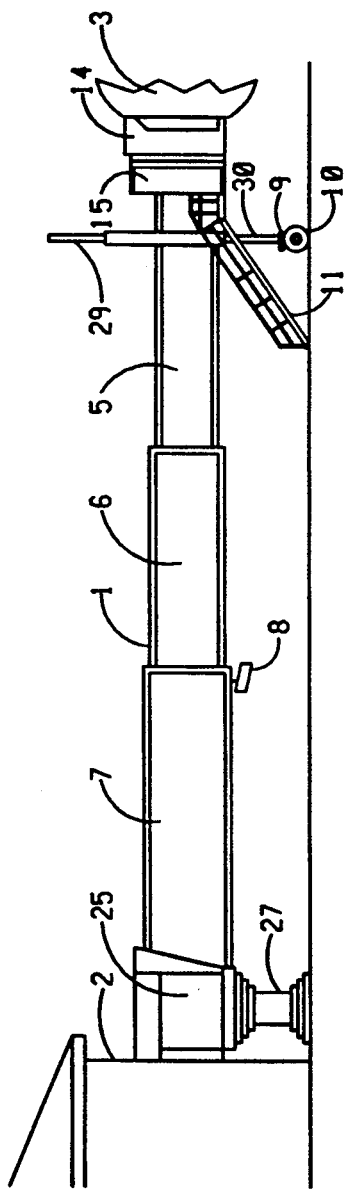
FIG. 2A is a side elevation drawing of a passenger loading bridge shown in conjunction with an aircraft and an airport terminal building.
Figure 2B:
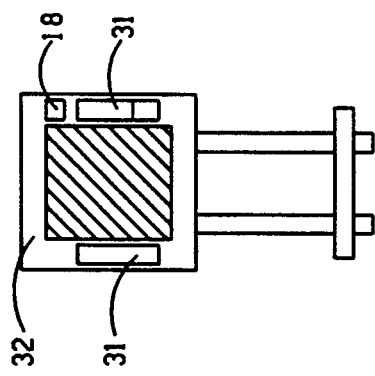
FIG. 2B is a frontal elevation drawing of a passenger loading bridge.
Figure 3B:
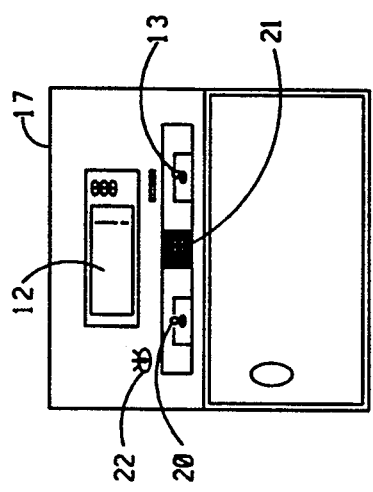
FIG. 3B is a fragmentary perspective view of a control console located in the operator's booth located in the vestibule of a passenger loading bridge.
Figure 3A:
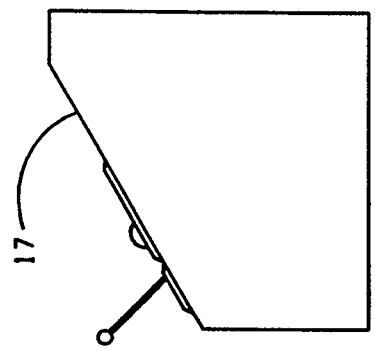
FIG. 3A is a fragmentary side view of a control console located in the operator's booth located in the vestibule of a passenger loading bridge.
Figure 3D:
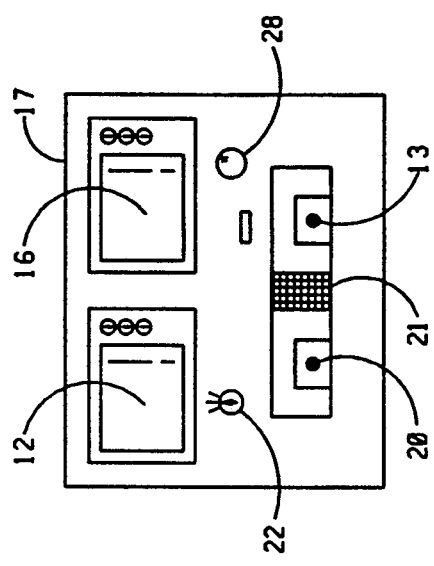
FIG. 3D is a variation of 3C showing an alternate embodiment of the disclosed apparatus.
Figure 3C:
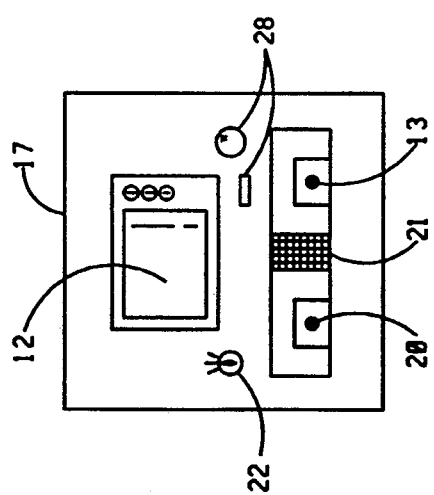
FIG. 3C is a plan view of the operator's console limited to only the controlling area.
Figure 4:
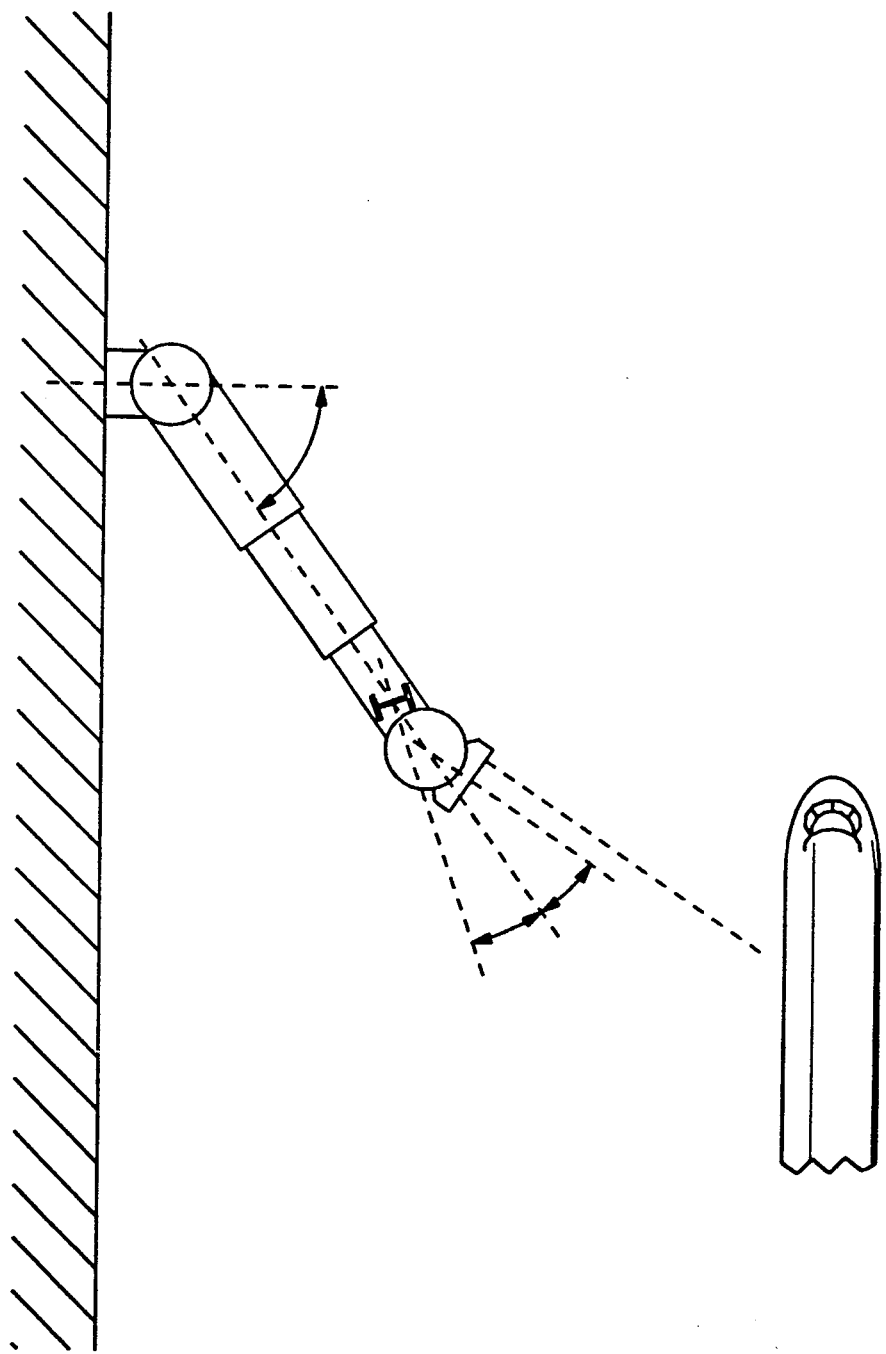
FIG. 4 is a variation of 1 showing trajectories and relative positions.
Figure 5B:
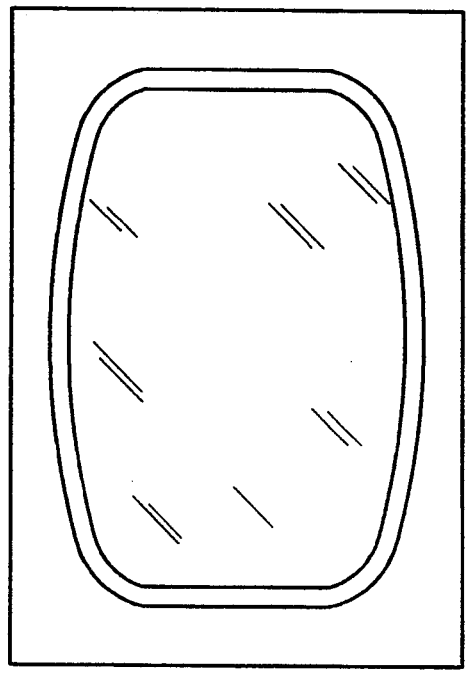
FIGS. 5a and 5b together are a view of the operator's console monitor(s) where the video camera and overlay output are displayed.
Figure 5A:
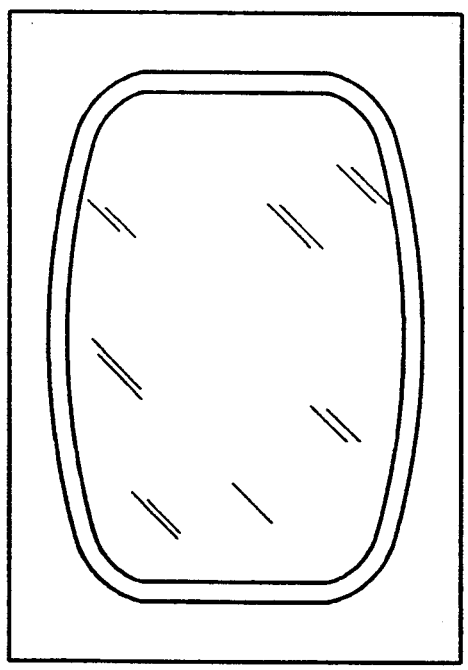

The disclosed apparatus will now be described with references to the drawings. In FIG. 1, a passenger loading bridge 1 is shown attached to an airport terminal building 2 and partway to/from an airplane 3 and in particular, the airplane access door 4. FIG. 2A shows a more detailed version of FIG. 1. 2 is the terminal building, 1 is the passenger loading bridge or air bridge, and 3 is the airplane. The passenger loading bridge shown is a three gallery or tunnel section version. Section 5 telescopes in/out of section 6, which does the same with section 7. A camera, 8 is mounted on the end of section 7, and is pointed at the wheel carriage 9, the wheels 10, and the stairs 11. The camera is used for safety and driving purposes as explained below.

The disclosed apparatus is applicable to both existing passenger loading bridges as a retrofit, and those to be built in the future. The disclosed apparatus will interface to any existing airbridge via a terminal block and quick disconnect connector. This retrofit role is especially useful because each manufacturer has their own console which is different for each airline and each model of airbridge. This is designed to be a universal console. Software changes can customize for any variation of airbridge and for each airline's needs. In the case of retro-fits, all or part of the disclosed apparatus might be used.

One of the novel features of the disclosed apparatus is the combined use of the display 12 and joystick 13. This combination provides a "drivability" feature not found in prior art. This is because the display is usually not in the operator's frame of reference and moving the joystick in a particular direction does not necessarily move the passenger loading bridge in that direction. The situation on all extant passenger loading bridges is such that the combination of display and joystick is sufficiently disorientating that damage to airplanes, ground equipment, and the air bridge is fairly common. Thus, prudent operators tend to drive the airbridge more slowly than the equipment is capable of. Unfortunately, the operator is also under pressure to speed up the process.

The display shown on monitor 12 of the disclosed apparatus shows positions relative to operator. However to give a complete situation status report to the operator, if desired, the system can also display motion relative to the terminal and/or the plane. With this setup, the operator just pushes the joystick 13 in direction he/she wants to go and the on-board computer figures out relative positions of joystick 13, vestibule (rotatable cabin head) 14, cabin 15, and wheel carriage 9 in order to calculate the proper commands for the motors.

FIG. 3 shows the details of the console. FIG. 3.B and 3.C show a single video monitor 12 of either TV or computer standard, while FIG. 3D also shows second monitor 16 which is useful, but not mandatory if control from a remote central location or fully automatic operation is desired. The first video monitor 12 will show a TV picture of the wheel carriage 9 and the access stairs 11 to aid the operator in maneuvering the wheel carriage and wheel 10 assembly, in assuring that there is neither personnel nor ground equipment in the way of the wheel carriage or the access stairs for safety, anti-collision, and security purposes.

The second monitor, 16 shows a TV picture of the docking target (i.e. the airplane door and surrounding windows in the case of the approach of an airbridge to an airplane). This monitor can either be mounted in the console 17 or be free-standing mounted wherever there is room and is convenient for the operator to see. the second monitor is only used when the second camera 18 is used. The second camera is an option of the customer for the tele-robotic case where the operator is located at the end of the passenger loading bridge. For full tele-robotic remote site control and for full automatic control, the second camera is necessary unless other sensors are added.

The operator tells the on-board computer 19 which way and how fast he desires to move via a generic input device. Examples of such a device include: conventional joystick, a capacitance pad, cursor arrow keys, push buttons, touch screens, light pens etc. This input device can have any interface: analog, digital, serial, parallel and not change the basic concept. FIG. 3 shows a joystick 13. FIG. 3 also shows a second joystick 20, whose purpose is to permit flexibility to the customer and the system designer. Uses of the second joystick 20 could include permitting a left handed operator to use their left hand to control the passenger loading bridge trajectory, or to control the vestibule (cabin head) 14, rotation and the height or the cabin 15. Another differentiation of the disclosed apparatus from prior art is the use of video overlay. This video overlay could be text and/or graphic data. The video overlay permits the computer to feedback information to the operator and has benefits similar to those of a heads-up display. Text overlay would be alpha-numeric information and could include, but would not be limited to: alarms, current height, preset (desired) height, type of airplane, time, and date. Graphical overlay could include, but would not be limited to: alarms, and relative position showing: terminal, bridge, cabin, plane, wheel carriage, and expected direction of motion. The computer acquires data including angle and amount of displacement of the joystick, angle of the wheels relative to the tunnel, angle of the vestibule relative to the tunnel, and the radius of curvature based upon gallery extension relative to the pivot point on the terminal. The computer then calculates the trajectory of the passenger loading bridge and then displays the path in simple graphical form to the operator in the operator's frame of reference. The format of this display will vary according to the tastes of the company which uses the device, but can be shown to be a variation on the basic concept by one experienced in the art.

Connections made between the console and the rest of the passenger loading bridge is via quick disconnecting connectors. This permit quick installation and change-out of consoles. Between the quick disconnect and the rest of the passenger loading bridge is one or more terminal blocks. This permits a break out of the wiring allowing mating to any existing or future air bridge.

The disclosed apparatus includes a number of real or virtual buttons as shown in FIGS. 3.B, 3.C, and 3.D. They can be conventional pushbuttons, or menus on the monitor, or touch screen, or variations on this theme. Examples of their functions include, but are not limited to: Hardwired emergency buttons such as Emergency stop, Emergency back-off, Emergency Electrical cut-off, Preconditioned Cool Air cut off.

There will also be a keypad 21 to enter data and/or commands such as, but not limited to: Cab lights, Flood lights, Ventilator, Floor Heating, Cab Floor Auto/-Manual, Left Canopy I/O, Right Canopy I/O, Cab Floor Up/Down, Cab Rotate Left/Right, Vertical Drive Up/Down, Vertical Drive to Preset position. The distribution of keys between conventional buttons, menus, touch screens, and keypad is strictly up to client's tastes; it has no functional impact.

In addition to the functions listed above there will be a Keyed switch 22. (This can be replaced by a identity code entered into the console before the computer will allow the operator to control the air bridge) to control functions such as, but not limited to: power on, manual, and auto-leveller.

The on-board computers 19 and 23 use control Algorithms to determine what to display on the screen and where to go based on position of each of the passenger loading bridge components and the commands entered via the console. Although FIG. 6 shows four on-board computers someone experienced in the Art can readily see that the disclosed apparatus can be made with one or more computers. The Display computer 19 can easily be combined with the control cabin 23 by using a hardware configuration with the combined attributes shown. The control computer 24 located in the Rotunda 25, and the control computer 26 located in the wheel carriage 9 are separated to 1) permit clarity of functionality, 2) permit lower computational and instrumentation loads on any one computer, and 3) to save on wiring by using digital communication rather than hardwire for instrumentation and control signals. It can be seen by one practiced in the art that the use of one to four (or more) computers/micro-processors is fundamentally the same device as the disclosed apparatus. Especially in the case of retro-fit, it is predictable that the control computer 24 located in the Rotunda and the control computer 26 located in the wheel carriage might well be left out and that the required sensor data such as wheel angle would come from either the existing sensors or new sensors added to permit use of the disclosed apparatus. Similarly, the display computer 19 and the control computer 23, both located in the vestibule and/or the cabin, might well be combined into a single computer, but not change the fundamental nature of the disclosed apparatus. This reduced version might function fully as described, or might only perform the functions of replacing the existing consoles with a uniform, simplified, standardized, computer assisted user interface, a control and display console.

The disclosed apparatus uses sensors to determine the relative position of the different components of the passenger loading bridge. By keeping track of where it was, its trajectory is easily calculated. This trajectory can be displayed to the operator. The disclosed apparatus can also predict the future trajectory based upon the operator's inputs, or planned commands in the full automatic mode. This predicted trajectory can also be shown to the operator to permit the operator to input the proper commands or to override using the joystick 13 and/or the emergency buttons 28 if either a potential collision is detected or the operator merely wants to do something else.

Rotary sensors detect the relative positions of the vestibule (rotating head) 14 relative to the cabin 15, the wheel carriage 9 relative to the cabin 15, and the gallery 7, 6, and/or 5 relative to the terminal 2.

Control signals are sent to the wheel carriage 9 and the vestibule 14. The wheels 10 can be commanded to operate together or independently to move in any direction and rate within the physical capabilities of the drive mechanism. This permits the wheels to rotate in place so that the airbridge can be maneuvered in close quarters and reach its destination in the minimum time (based upon safety considerations and drive mechanism specifications). The vestibule 14 can be rotated relative to the cabin 15 to permit alignment with the side of the target vehicle 3.

As is stated above, one of the fundamental differences of the disclosed apparatus from prior art is the combined use of the display and the joystick. The display is discussed in detail above. The disclosed apparatus uses the joystick, or other similar input device, to permit the operator to indicate to the on-board computer where they would like to go. The operator does not directly control the wheels, and does not necessarily even need to know where the wheels are and what they are doing. The computer accepts the input as a desired direction and then interprets it in terms of the position of the console (distance, direction and rotation from the wheels), the operator, and the operator's viewpoint (or the camera's viewpoint in the case of full tele-robotic or automatic operation). This desired direction of motion is then coupled with knowledge of the relative position of the different system components i.e. rotation of the vestibule about the cabin, the gallery sections about the pedestal 27, and the wheels relative to the gallery sections.

The disclosed apparatus has the advantage over prior art of being able to digitally lock out an envelope where the passenger loading bridge cannot be steered for safety reasons. This could be specific to each airplane or other vehicle such that the passenger loading bridge is prohibited from entering a region where the airplane wing, door, engine etc might be expected. The disclosed apparatus was designed to permit modification to a completely tele-robotic system operated from a remote central station or fully automatic system with human override capabilities as explained below.

Height is also controlled by the onboard computer. The operator can either enter the airplane type, which has a known preset height stored in a look-up table, enter the desired preset height or manually drive to the desired height. Preset heights can be selected from a menu displayed on the monitor 12 or 16 using the video overlay, entered directly through a keypad 21, and increment decrement input device not shown, or other similar means. The manual drive is actually just telling the on-board computer up or down using the second joystick, 20 or any of the other real or virtual buttons/input devices. The computer then sends the required signals to drive the motors which move the passenger bridge up or down using a physical mechanism such as 29 and 30.

Unlike prior art, the disclosed apparatus preferentially uses optical shaft encoders, not rotary potentiometers or selsyn transmitters and receivers. This is because optical shaft encoders do not drift over time and the resolution can basically be made as high as is required. Drift from the sensors on the rotatable vestibule 14 and on the carriage wheel 9 can easily cause the operator to unknowningly steer into and damage a vehicle or support equipment, or injure personnel.

In addition to the camera 8 which can provide visual warning to the operator (or to the computer if machine vision is added) about the presence of personnel or equipment by the wheel carriage, light or acoustic presence/ranging sensors can be used as backup.

As explained above, the disclosed apparatus is designed to use one or more computers depending on the configuration. In the case of a simple retro-fit of only the console of an existing passenger loading bridge, only one computer is needed. However, additional computers can be used as nodes to accept data and then transmit data to the other computers rather than hardwire each sensor to main controller or Junction Box. This data can be transmitted either through conventional wiring such as, but not limited to, signal wire or fiber optic link, or the data can be transmitted via modulation of the power supply. These same approaches can be used for communication with a central station. The ability to communicate with a central station permits the passenger loading bridge computer to send alarms and maintenance data, including the status of each subsystem and or component to the central station. It is also possible to control/operate the passenger loading bridge from central station. Security data can also be sent to the central station: Video, indications of opening of doors, and intruder alarms (ex. ultrasonic, infrared etc.).

The disclosed apparatus generally will include one or two cameras 8 and 18 depending on desired level of tele-robotic/automatic implementation. The first camera 8 is looking at wheel carriage to avoid hitting Ground Support Equipment and to provide a security view of the access stairs 11. The second camera 18 is looking at the vehicle/vessel with which the passenger loading bridge is mating. This second camera 18 provides the operator with the ability to see the vehicle to which the passenger loading bridge is mating without having to look away from the control panel. This is of benefit in that the operator can not look at a console and out of the passenger loading bridge window 31 or door 32 at the same time. The two monitors 12 and 16 are shown in FIG. 3. (Alternatively, the two video pictures can be displayed on the same monitor if an image splitter is used.) The views from these two cameras are sufficient for an operator located at a remote central station to dock the passenger loading bridge using a duplicate control panel. The central station could be located anywhere in the terminal or on the airport grounds. Through the use of video compression or other transmission techniques, the central station could be located practically anywhere in the world.

The video pictures from these two cameras can be fed into a frame grabber/machine vision system. Such a system could identify the type of airplane or other vessel, its range and relative position. This is sufficient for the passenger loading bridge to dock with the vehicle/vessel in a fully automatic manner without assistance by an operator, and without having to place a reflective marker, bar code, or other marking on the vehicle to facilitate this. The machine vision system will use the "blob" approach to identify the presence and location of the doors and windows. "Edge detection" will be used to size the doors and windows. The relative position and sizes of the windows and doors is sufficient to identify the plane type. The angle of the edges of the top and bottom of the door relative to horizontal is sufficient to identify the angle of the airplane relative to the vestibule, and the apparent size of the door is sufficient to tell range.

In the case of an airplane, if the transponder is on and/or an automated taxiway management system is in use, then a central computer, knows what type of aircraft is approaching the passenger loading bridge and can inform the passenger loading bridge computer. The passenger loading bridge computer can then look in its memory for information about the airplane such as the height of the door and the spacing between the door and windows fore and aft. This permits the on-board computer to calculate the plane's range and relative position.

A piece of ancillary equipment is the Maintenance kit. The Maintenance kit consists of a computer which permits the maintenance man to override the system, diagnose system, modify software, and calibrate the system. The kit includes a computer, a video screen, and a means to enter data.

We claim:

1. A motorized passenger loading bridge which has one end rotatably connected to a structure surrounding an access passage of said structure, an extendable and retractable passageway extending between and connecting said access passage and a cabin, said cabin being rotatable about a vertical axis, and wherein the passageway is supported on a motorized wheel carriage having an adjustable height mechanism and a plurality of wheels thereon, sensing means including a plurality of sensors for sensing the rotation of said wheels, said cabin, and said passageway, and for sensing the translation of the passageway and the passageway height with respect to a door on a parked vehicle, said sensors mounted on said rotatably connected end and also mounted on said wheel carriage, said cabin, and said passageway, display means for communicating by video display the relative positions of the passenger loading bridge, said display means including a plurality of camera means mounted on the loading bridge structure in positions for viewing the location and motion of said passageway, and at least one video screen for displaying images generated by said camera means and computer means, wherein said video screen is within the cabin and visible to an operator, control means for regulating the alignment of said bridge with said door on a parked vehicle in response to said display means, said control means including an input means for input of commands by an operator, wherein said input means are located within said cabin and wherein an operator inputs said commands from within said cabin, and also including a computer means for receiving input data from said sensors and said input means, wherein said computer means interprets input commands within the frame of reference of the operator and converts said commands to the frame of reference of the passenger loading bridge, and an automatic adjusting means responsive to said converted commands and adapted to control, adjust and rotate said carriage wheels accordingly.

* * * * *